Dec. 13, 1966 R. H. MARTIN ETAL 3,292,088

FREQUENCY MODULATION COMPRESSION RECEIVER

Filed March 29, 1963

3,292,088

FREQUENCY MODULATION COMPRESSION RECEIVER

Ronald H. Martin, Hamilton, Ontario, Canada, and Alan J. Buxton, Belmont, Calif., assignors to Canadian Westinghouse Company Limited, Hamilton, Ontario, Canada, a company of Canada Filed Mar. 29, 1963, Ser. No. 269,006
5 Claims. (Cl. 325—346)

This invention relates to frequency modulation compression systems and in particular to such systems intended for operation near threshold and having wide deviation.

There are at least two systems for producing compression of the incoming signal. In one, for example, the incoming signal is mixed with the local oscillation, the output is amplified and detected and a portion of the detector output is applied to a modulator which modulates the frequency of the local oscillator. By proper phasing of the modulation it is evident that a deviation of the same nature as the deviation of the incoming signal may be applied to the local oscillation thus causing the output of the mixer to have a lesser deviation than the incoming signal. Alternatively, the output from the mixer can be applied to a multiplier, the output of this multiplier serving as a virtual local oscillator. There will be of course intervening amplifier stages between the mixer and the multiplier. Since these intermediate stages are amplifying the signal which contains a deviation proportional to the deviation of the incoming signal it will be appreciated that tthe output from the multiplier similarly contains a deviation proportional to the deviation of the incoming signal. By proper polarization, the result of mixing the output from the multiplier with the incoming signal will be to produce an output from the mixer having a deviation less than the deviation of the incoming signal.

Systems operating in accordance with this latter method have certain disadvantages—as the amplitude of the incoming signal reduces, the output from the mixer reduces, hence producing a reduction in output from the amplifiers and in turn a reduction of driving signal for the multiplier which in turn produces a reduced output from the multiplier. As the output of the multiplier is applied to the mixer a reduction in this signal will also produce a reduction of output from the mixer. It can be seen that this is a cumulative effect and when the incoming signal falls below a certain value, the whole system rapidly ceases to operate. As the incoming signal rises, however, the system does not immediately resume operation since there is no output from the mixer of a frequency which will be accepted by the amplifier until there is some output from the multiplier, on the other hand, there can be no output from the multiplier until there is some input. The system therefore does not resume operation until it is either accidently or by virtue of strong input, shock excited whereupon it resumes operation.

To avoid this problem two solutions have been proposed in the past, one is to utilize rather than a true multiplier, a locked oscillator, which is locked in frequency with the output from the amplifier. This solution is adequate in some situations, however, where the deviation of the incoming signal is great it is difficult to obtain a locked oscillator that will operate satisfactorily. Another solution to the problem which has been proposed is to have an auxilliary local oscillator at approximately the right frequency continually feeding a small signal to the multiplier. This is, in effect, a continual shock excitation of the multiplier. This solution is adequate under some circumstances also, but when there are stringent, noise, and cross-talk requirments the local oscillation contributes to the problems of meeting these requirements and in some circumstances in order to meet the noise and cross-talk requirements the signal from the auxilliary local oscillator had to be so reduced that it did not serve a useful function.

It is therefore an object of this invention to provide an improved frequency modulation compression system.

It is a further object of this invention to provide a frequency modulation compression system which recommences operation at the same input signal level as that at which it ceases operation as the signal level decreases.

These and other objects are attained by providing in such a system a mixer which is fed from a source of incoming signals, and from a local frequency source comprising a frequency multiplier. The output from the mixer is applied to a limiting amplifier and the output from the amplifier applied to the frequency multiplier. This loop is so arranged that the deviations of the output from the frequency multiplier are in the same phase as the deviations of the incoming signal thus reducing the deviation of the output from the mixer. A positive feed-back path is provided around the limiting amplifier. This path is so arranged that when the limiting amplifier has maximum gain it is in an oscillatory condition. On the other hand, as the gain of the amplifier decreases the amplifier ceases to oscillate. The limiting amplifier is so arranged that its gain is maximum when the input is insufficient to produce limiting and reduces as soon as a signal sufficient to produce limiting is applied. The frequency of oscillation of the limiting amplifier must be some frequency within its normal bandpass. As a result therefore, as the input signal to the system decreases and the output from the mixer is reduced to such a point that limiting does not occur in the amplifier, the amplifier tends to go into oscillation causing a continual supply of signal to the multiplier. Hence, the multiplier does not cease to operate when the input signal is reduced, and there is no cumulative effect which tends to suddenly cause the system to cease operation. On the other hand, when signal is adequate to cause limiting in the limiting amplifier, the amplifier ceases to oscillate and there is no signal introduced in the system to impair the noise or cross-talk characteristics.

A clearer understanding of this invention may be had from the following specification and drawing which:

Figure 1:
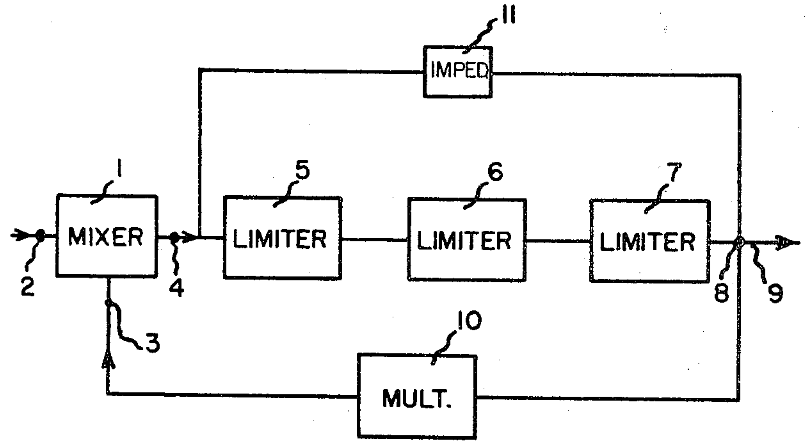
FIGURE 1 illustrates a system in accordance with our invention.

In FIGURE 1 there is shown a schematic diagram of a portion of a frequency modulation receiver. 1 is a mixer to which is applied at terminal 2 the incoming signal which is a frequency modulated signal having a wide deviation and to terminal 3 is applied the local oscillation. The output from terminal 4 is applied to a limiting amplifier comprising several stages such as those illustrated, 5, 6, and 7. The output from this limiting amplifier appears at terminal 8 and is applied to further stages in the receiver for utilization through lead 9. The output at terminal 8 is also applied to the multiplier 10 and the output from multiplier 10 applied to terminal 3 of the mixer. The output from terminal 8 is also applied to terminal 4 through impedance device 11. This path between terminal 8 and terminal 4 through device 11 constitutes a positive feed-back circuit over the amplifier. For the sake of simplicity let us assume that the input signal has a center frequency of forty megacycles and the mixer has an output having center frequency of ten megacycles. The center frequency of the passband of the limiter amplifier is similarly ten megacycles. The signal therefore applied to the multiplier 10 similarly has a center frequency of ten megacycles. If the multiplier has a multiplying factor of three, the output from the multiplier 10 is thirty megacycles which is then applied to the mixer. It will be seen that with an input of forty megacycles to terminal 2 and thirty megacycles to terminal 3 the difference frequency at terminal 4 will be ten megacycles. Let us now consider the operation of the limiting amplifiers 5, 6, and 7, together with the feed-back path including impedance 11. The limiting amplifiers are so designed that with a useful output at terminal 4 the amplification of the amplifiers is sufficient to cause limiting in at least one of the stages. It is characteristic of such an amplifier that the amplification is higher when no limiting occurs than is amplification when limiting is occurring. If now the impedance of device 11 is so adjusted that with maximum gain on amplifiers 5, 6, and 7, there is just sufficient feed-back to cause oscillation then it is evident that as long as limiting occurs in one of the stages the gain of the amplifier is insufficient to maintain oscillation. Let us assume that an appreciabe and useful signal is being received and therefore a useful signal is appearing at terminal 4. The system operates as previously described and the signal appearing at terminal 4 is amplified by amplifiers 5, 6, and 7, and limited, and appears in terminal 8 for further utilization. It also is fed back by the feedback path through impedance 11 but this feedback is insufficient to cause oscillation. The multiplier operates as previously described and enables the continued operation of the system.

Let us now assume that signal at terminal 2 fades until an insufficient signal is produced at terminal 4 to produce limitation in the amplifiers. Under normal circumstances this would mean that the signal appearing at terminal 8 was insufficient to drive the multiplier 10 and the system would collapse. However, due to the presence of the feedback path, and the increase in gain of the amplifiers, the system including the amplifiers and the feed-back path goes into oscillation. The frequency of oscillation of course being a frequency within the bandpass of the amplifiers. This oscillation is then fed to the multiplier which continues to produce an output which is applied to terminal 3. This output may not be exactly the right frequency to mix with any incoming signal and produce a useful signal at terminal 4 but it is a frequency which will produce a signal which will pass through the amplifiers. Therefore, as soon as the signal received at terminal 2 again becomes of sufficient amplitude to be useful, the signal at terminal 4 becomes a useful value and the signal applied to the multiplier will tend to conform to the signal appearing at terminal 4. The system therefore does not collapse but continues in operation and commences to produce a useful output at terminal 8 as soon as a useful signal is received at terminal 2.

The selection of impedance device 11 may be made by keeping the following points in mind:

In order for oscillation to build up in the loop including limiter amplifiers 5, 6, and 7, and impedance device 11, the gain around the loop must be greater than one at the frequency of oscillation.

The phase shift around the loop must be 180° or any odd multiple of 180° at the frequency of oscillation. When both these relationships are satisfied the loop will oscillate and of course its frequency will be some frequency with the passband of the amplifier.

While in the foregoing description it has been assumed that the oscillation is caused by the change in gain of the limiters and a feed-back path around the limiting amplifiers, it will be evident that there are other means of producing the same result, that is, producing an oscillation in the receiver only when the received signal is below the usable level. For example, a completely independent oscillator could be used injecting its signal at terminal 4 with this oscillator cut off at all times when a usable signal is appearing at terminal 4. This might be accomplished for example by biasing the oscillator off with a rectified component from the signal appearing at terminal 8 when the signal at terminal 8 falls below a certain value, the oscillator is no longer cut off and commences to feed its output to terminal 4.

Figure 2:
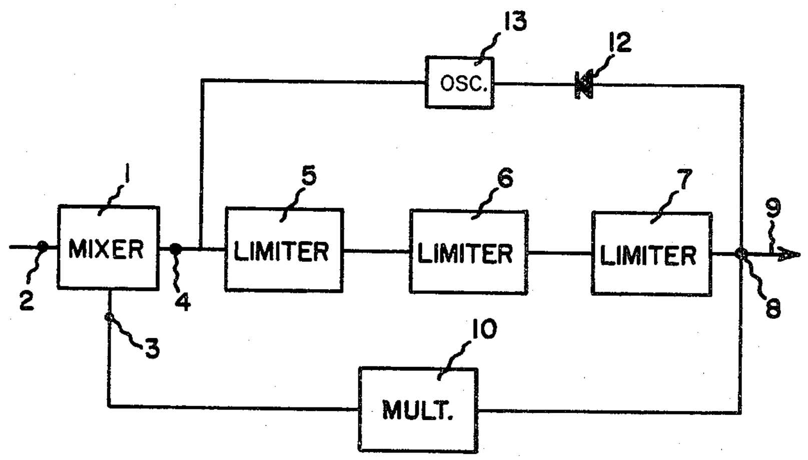
FIGURE 2 illustrates a further system in accordance with our invention.

Such an arrangement is shown in FIGURE 2; here the same components bear the same designations and the operation of the compression system is as before, the only new elements are elements 12 and 13, 12 being a rectifier and 13 being an oscillator operating at the mid frequency of amplifiers 5, 6, and 7. The output from rectifier 12 is applied to oscillator 13 in such a way that as long as the output is above a certain value the oscillator 12 is cut off but when the output from rectifier 12 falls below the specified value the oscillator begins to function causing an oscillation to be fed to terminal 4 through the amplifiers 5, 6, and 7, and thus to multiplier 10. While only two embodiments have been shown, other modifications will be evident to those skilled in the art.

What we claim is:

1. A frequency modulation compression receiver including a mixer, a source of incoming signal applied to said mixer, a source of local oscillations applied to said mixer, said source of local oscillations comprising a frequency multiplier, a limiting amplifier coupled to the output of said mixer, an impedance arranged to apply a further local oscillation to the output of said mixer and a coupling from the output of said amplifier to said impedance permitting the generation of said further local oscillation only when the output of said amplifier is below usable level, and means to apply the output of said limiting amplifier to said frequency multiplier.

2. A frequency modulation compression receiver as claimed in claim 1 wherein said impedance provides a positive feed-back path for paid amplifier.

3. A frequency modulation compression receiver as claimed in claim 2 wherein said limiting amplifier oscillates when the output from said mixer is below usable level.

4. A frequency modulation compression receiver as claimed in claim 1 including a further oscillator for generating said further local oscillation.

5. A frequency modulation compression receiver as claimed in claim 4 wherein the output of said further oscillator is controlled by the output from said limiting amplifier.

References Cited by the Examiner

UNITED STATES PATENTS

| | | | |
|---|---|---|---|
| 2,687,476 | 8/1954 | Guanella | 325—351 X |
| 3,001,068 | 7/1958 | Morita et al. | 325—346 |

KATHLEEN H. CLAFFY, *Primary Examiner.*

R. S. BELL, *Assistant Examiner.*